(12) United States Patent
Yang et al.

(10) Patent No.: US 7,999,527 B2
(45) Date of Patent: Aug. 16, 2011

(54) SWITCHING CONTROLLER HAVING PROGRAMMABLE FEEDBACK CIRCUIT FOR POWER CONVERTERS

(75) Inventors: Ta-Yung Yang, Milpitas, CA (US); Chien-Tsun Hsu, Taipei (TW); Cheng-Sung Chen, Taichung County (TW); Ting-Ta Chiang, Chiayi County (TW)

(73) Assignee: System General Corp., Taipei Hsien (TW)

( * ) Notice: Subject to any disclaimer, the term of this patent is extended or adjusted under 35 U.S.C. 154(b) by 485 days.

(21) Appl. No.: 12/262,137

(22) Filed: Oct. 30, 2008

(65) Prior Publication Data
US 2009/0200997 A1    Aug. 13, 2009

Related U.S. Application Data

(60) Provisional application No. 61/065,201, filed on Feb. 7, 2008.

(51) Int. Cl.
*G05F 1/40* (2006.01)

(52) U.S. Cl. ............... 323/284; 323/224; 363/98

(58) Field of Classification Search ............... 323/222, 323/224, 225, 282–288; 363/16–17, 21.04, 363/21.08, 21.12, 21.13, 21.16, 49, 89, 97, 363/98, 132
See application file for complete search history.

(56) References Cited

U.S. PATENT DOCUMENTS

| | | | | |
|---|---|---|---|---|
| 5,773,966 A | * | 6/1998 | Steigerwald | 323/284 |
| 6,127,815 A | * | 10/2000 | Wilcox | 323/282 |
| 6,469,914 B1 | * | 10/2002 | Hwang et al. | 363/21.01 |
| 6,724,174 B1 | * | 4/2004 | Esteves et al. | 323/224 |
| 7,482,788 B2 | * | 1/2009 | Yang | 323/224 |
| 7,498,788 B2 | * | 3/2009 | Yang | 323/283 |

* cited by examiner

*Primary Examiner* — Rajnikant B Patel
(74) *Attorney, Agent, or Firm* — Jianq Chyun IP Office

(57) ABSTRACT

A switching controller for a boost power converter includes a switching-control circuit and a programmable feedback circuit. The programmable feedback circuit is coupled to an output of the boost power converter via a voltage divider. The programmable feedback circuit includes a current source coupled to a switch. On a light-load condition, a power-saving signal turns on the switch. The switch will conduct a programming current supplied by the current source toward the voltage divider. Furthermore, the voltage divider is externally adjustable for programming a determined level of an output voltage of the boost power converter on the light-load condition. Additionally the present invention increases system design flexibility to meet practical power-saving requirements without adding circuitries and increasing cost.

11 Claims, 2 Drawing Sheets

SWITCHING CONTROLLER HAVING PROGRAMMABLE FEEDBACK CIRCUIT FOR POWER CONVERTERS

CROSS-REFERENCE TO RELATED APPLICATION

This application claims the priority benefit of U.S. provisional application Ser. No. 61/065,201, filed on Feb. 7, 2008. The entirety of the above-mentioned patent application is hereby incorporated by reference herein and made a part of this specification.

BACKGROUND OF THE INVENTION

1. Field of the Invention

The present invention relates to power converters, and more particularly, relates to a switching controller of power converters.

2. Description of Related Art

FIG. 1 schematically shows a circuit of a boost power converter. An input voltage $V_{IN}$ is supplied to an inductor 20. A rectifier 30 is connected between the inductor 20 and an output of the boost power converter to provide an output voltage $V_O$. The output voltage $V_O$ is a boosted voltage which is higher than the input voltage $V_{IN}$. The output voltage $V_O$ is used to power a load 46, for example, a PWM switching circuitry. A power switch 10 coupled to a joint of the inductor 20 and the rectifier 30 performs energy switching to regulate the output voltage $V_O$.

In conventional boost power converters, when the input voltage $V_{IN}$ is 90VDC, for example, the output voltage $V_O$ will be boosted up to around 380VDC irrespective of load conditions of the load 46. That is, the conventional boost power converter maintains its output voltage $V_O$ at 380 VDC as the load 46 decreases to a light-load condition. This lowers the conversion efficiency because a sufficient level of the output voltage $V_O$ on the light-load condition would be only 300 VDC, for example. Redundant power consumption is therefore wasted on the switching loss of the power switch 10 and the power loss of the rectifier 30.

In order to avoid redundant power consumption as mentioned above, FIG. 2 shows a conventional switching controller 100a to solve this problem. Referring to FIG. 1, the boost power converter comprises a switching controller 100. A feedback terminal FB of the switching controller 100 is coupled to the output of the boost power converter via a voltage divider 50. The voltage divider 50 comprises two resistors 51 and 52 connected in series between the output of the boost power converter and a ground reference. A capacitor 40 is connected to the voltage divider 50 in parallel. An output signal $V_{FB}$ received at the feedback terminal FB is obtained at a joint of resistors 51 and 52.

FIG. 2 schematically shows a circuit of the switching controller 100a of the boost power converter. The switching controller 100a comprises a switching-control circuit. The switching-control circuit comprises an oscillator 110, an inverter 150, a flip-flop 155, an AND gate 160, and a comparator 250. The oscillator 110 generates a pulse signal PLS and a ramp signal RMP. The flip-flop 155 receives a power source $V_{CC}$, and clocked by the pulse signal PLS via the inverter 150 to enable a switching signal $V_{SW}$ at a terminal SW. The output signal $V_{FB}$ is supplied to a negative input of an error amplifier 200a via the feedback terminal FB. A first terminal of a first switch 120 and a first terminal of a second switch 130 are both connected to a positive terminal of the error amplifier 200a. A second terminal of the first switch 120 is supplied with a first reference voltage $V_H$. A second terminal of the second switch 130 is supplied with a second reference voltage $V_L$. The second reference voltage $V_L$ is lower than the first reference voltage $V_H$. The first switch 120 is controlled by a power-saving signal $S_E$ via an inverter 140. The second switch 130 is controlled by the power-saving signal $S_E$. The error amplifier 200a generates a feedback signal $V_{COM}$ transporting to a compensation terminal COM which is connected to a capacitor 45. The comparator 250 compares the ramp signal RMP and the feedback signal $V_{COM}$. Once the ramp signal RMP is higher than the feedback signal $V_{COM}$, the flip-flop 155 is reset and the switching signal $V_{SW}$ is disabled.

The switching controller 100a further comprises a comparator 380 to compare the feedback signal $V_{COM}$ and a light-load threshold $V_{TH}$. On normal/heavy load conditions, the first switch 120 is turned on and the positive terminal of the error amplifier 200a is supplied with the first reference voltage $V_H$. As the load condition of the load 46 decreases, the output signal $V_{FB}$ increases responsively, which decreases the feedback signal $V_{COM}$. Once the feedback signal $V_{COM}$ is lower than the light-load threshold $V_{TH}$, the comparator 380 generates a power-saving signal $S_E$ to turn on the second switch 130. The power-saving signal $S_E$ also turns off the first switch 120 via the inverter 140. Thus, the positive terminal of the error amplifier 200a is supplied with the second reference voltage $V_L$ instead. This further generates a lower feedback signal $V_{COM}$ compared to the feedback signal $V_{COM}$ when the positive terminal of the error amplifier 200a is supplied with a first reference voltage $V_H$. The lowered feedback signal $V_{COM}$ shortens an on-time of the switching signal $V_{SW}$. Therefore, the output voltage $V_O$ decreases to, for example, 300 VDC to sufficiently power the load 46.

When the output signal $V_{FB}$ at the negative terminal of the error amplifier 200a decreases due to an increased load condition of the load 46, the feedback signal $V_{COM}$ increases responsively. As the feedback signal $V_{COM}$ is higher than the light-load threshold $V_{TH}$, the power-saving signal $S_E$ is disabled and the positive terminal of the error amplifier 200a is supplied with the first reference voltage $V_H$ again.

This further increases the feedback signal $V_{COM}$. The on-time of the switching signal $V_{SW}$ is expanded and the output voltage $V_O$ is again boosted to, for example, 380 VDC to sufficiently power the load 46.

As mentioned above, the conventional art is able to solve the problem of redundant power consumption of boost power converters on the light-load condition. However, the determined level of the output voltage $V_O$ in the conventional art on the light-load condition is fixed because it is restricted by the reference voltages $V_L$ embedded in the switching controller 100a. This restricts the boost power converters to meet their practical power-saving requirements, for instance, to further reduce the determined level of the output voltage $V_O$ on the light-load condition from 300 VDC to 260 VDC. The conventional art fails to externally programming its determined output voltage level required whenever needed.

As a result, there is a need to provide a boost power converter not only capable of regulating the output voltage $V_O$ in response to different load conditions but capable of externally programming a determined output voltage level to meet practical power-saving requirements.

SUMMARY OF THE INVENTION

A switching controller for a boost power converter comprises a switching-control circuit and a programmable feedback circuit. The switching-control circuit generates a switching signal. The programmable feedback circuit is coupled to an output of the boost power converter via a voltage divider. The programmable feedback circuit comprises an error amplifier, a current source, a switch, and a power management circuit. The error amplifier receives a feedback threshold and an output signal derived from the voltage divider for generating a feedback signal. The power management circuit comprises a comparison circuit and a delay circuit. The delay circuit provides a delay period for stabilizing the switching operation between different output voltage levels of the boost power converter in response to load conditions. The comparison circuit compares the feedback signal and a light-load threshold. Once the feedback signal is lower than the light-load threshold for longer than the delay period, which indicates a light-load condition, the delay circuit generates a power-saving signal to turn on the switch. The switch then conducts a programming current supplied by the current source toward the voltage divider. Therefore, the output signal is increased and the output voltage of the boost power converter is lowered. Besides, the voltage divider is adjustable for programming a determined level of the output voltage of the boost power converter on the light-load condition.

Therefore, the present invention is directed to a programmable feedback circuit for adaptively regulating the output voltage of the boost power converter on different load conditions.

The present invention is further directed to a determined output voltage level of the boost power converter externally programmed to meet practical power-saving requirements on light-load conditions.

The present invention is further directed to reduction of conversion loss and improvement of the efficiency without adding circuitries and increasing cost on light-load conditions.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DESCRIPTION OF THE EMBODIMENTS

Figure 2:
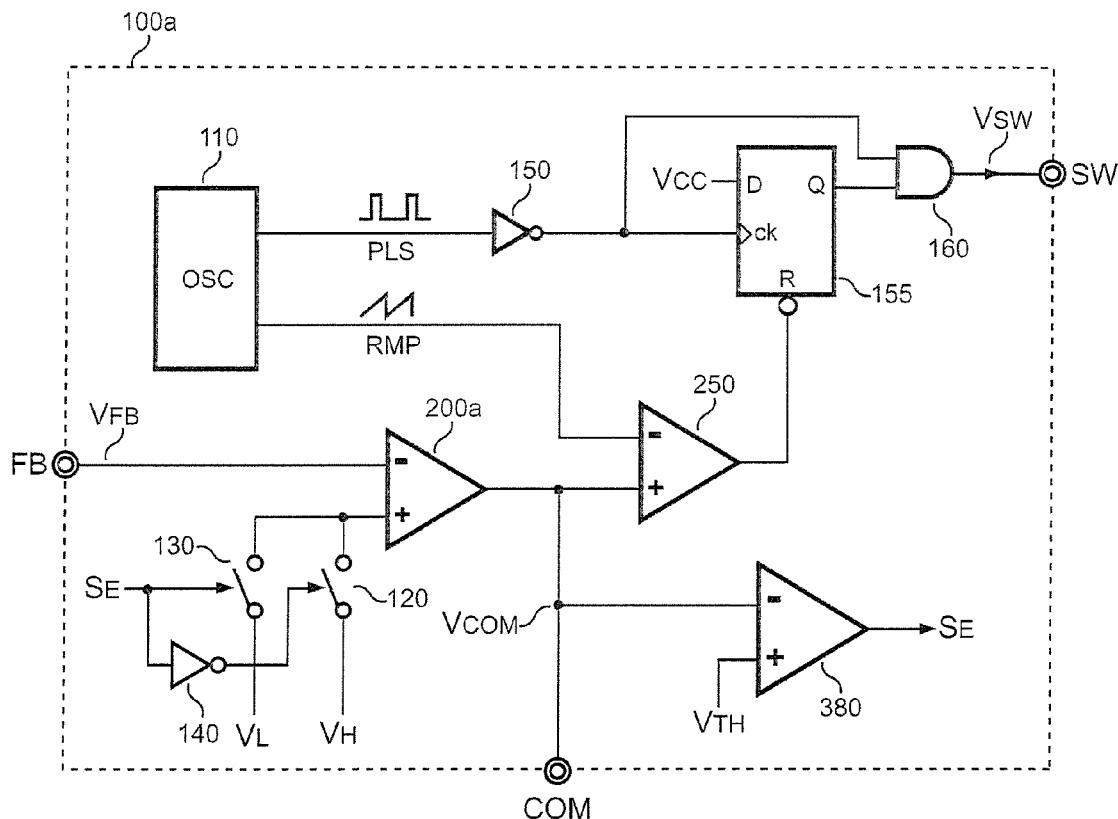
FIG. 2 schematically shows a circuit of a conventional switching controller of the boost power converter.
Figure 3:
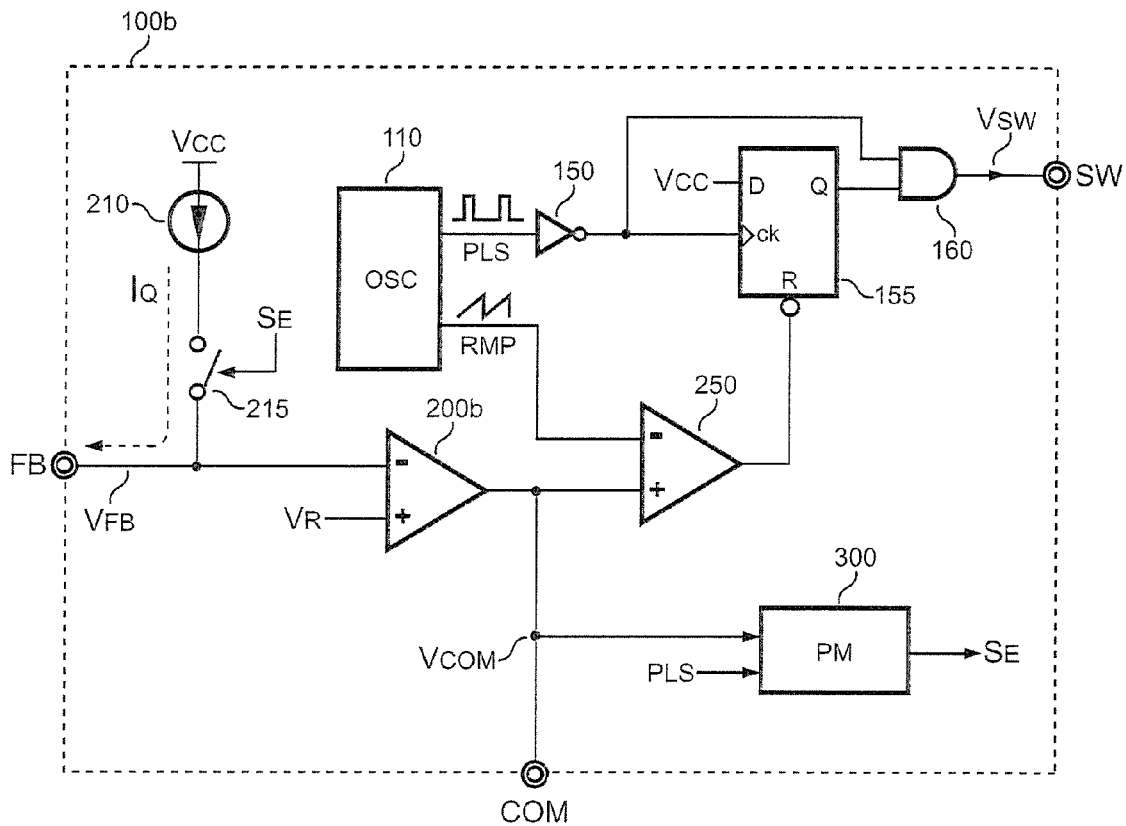
FIG. 3 shows a switching controller of a boost power converter according to an embodiment of the present invention.

FIG. 3 shows a switching controller 100b of a boost power converter according to an embodiment of the present invention. The switching controller 100b comprises a switching-control circuit including the oscillator 110, the inverter 150, the flip-flop 155, the AND gate 160 and the comparator 250. The operation of the switching-control circuit in FIG. 3 is already explained in FIG. 2 and will be omitted herein.

As shown in FIG. 3, a feedback terminal FB of the switching controller 100b is connected to a negative terminal of an error amplifier 200b. A positive terminal of the error amplifier 200b is supplied with a feedback threshold $V_R$. The error amplifier 200b receives an output signal $V_{FB}$ and the feedback threshold $V_R$ to generate a feedback signal $V_{COM}$. The switching controller 100b further comprises a programmable feedback circuit. The programmable feedback circuit comprises the error amplifier 200b, a current source 210, a switch 215, and a power management circuit 300. The error amplifier 200b is coupled to the switching-control circuit for modulating a switching signal $V_{SW}$. The switch 215 is connected between the current source 210 and the feedback terminal FB of the switching controller 100b. The switch 215 is controlled by a power-saving signal $S_E$.

Figure 4:
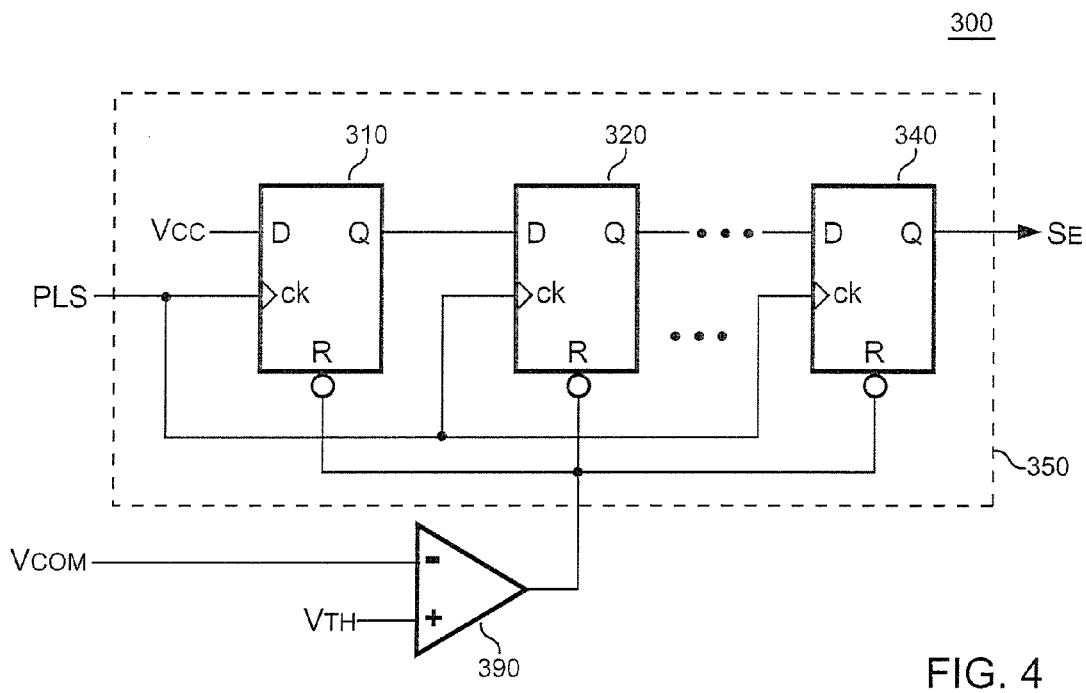
FIG. 4 shows a power management circuit of the switching controller according to an embodiment of the present invention.

FIG. 4 shows an embodiment of the power management circuit 300. The power management circuit 300 comprises a comparison circuit 390 and a delay circuit 350. The delay circuit 350 is formed by a plurality of cascaded flip-flops 310~340, in one embodiment, to provide a delay period. The comparator 390 compares the feedback signal $V_{COM}$ and a light-load threshold $V_{TH}$. When the feedback signal $V_{COM}$ is lower than the light-load threshold $V_{TH}$, which indicates a light-load condition, the comparator 390 enables the delay circuit 350. The delay circuit 350 then generates the power-saving signal $S_E$ after the delay period of the delay circuit 350. The level of the feedback signal $V_{COM}$ also represents the load condition of the load 46 in FIG. 1. Therefore, the power-saving signal $S_E$ is only generated as the light-load condition of the power converter sustains for longer than the delay period of the delay circuit 350. The delay period stabilizes the switching operation between different output voltage levels of the boost power converter in response to load conditions.

Both referring to FIG. 3 and FIG. 4, a terminal of the current source 210 is supplied with the power source $V_{CC}$. Another terminal of the current source 210 is coupled to the feedback terminal FB via the switch 215. Normal/heavy load conditions exist while the feedback signal $V_{COM}$ is higher than the light-load threshold $V_{TH}$. On normal/heavy load conditions, cascaded flip-flops 310~340 are reset by the comparison circuit 390, and the power-saving signal $S_E$ remains disabled. An on-time of the switching signal $V_{SW}$ is modulated to satisfy normal/heavy load switching requirements.

Figure 1:
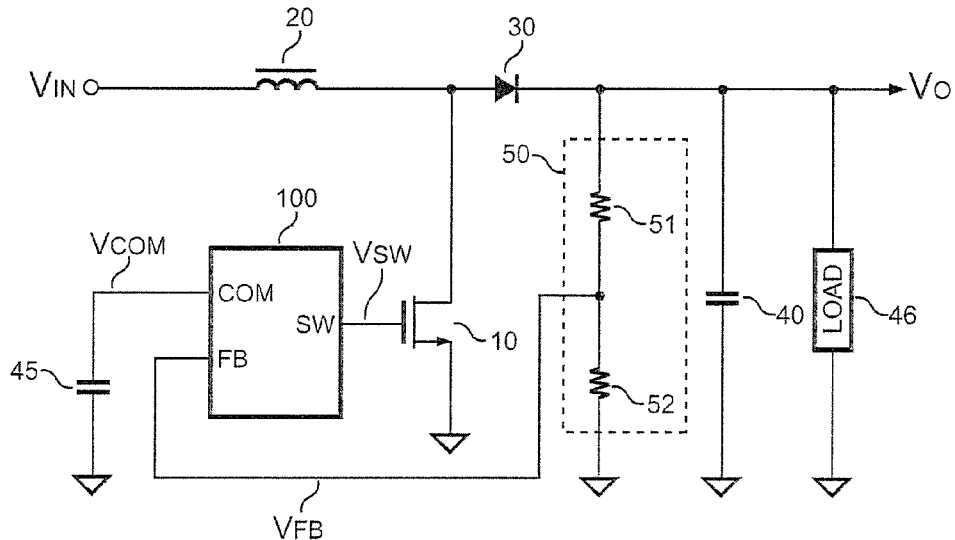
FIG. 1 schematically shows a circuit of a boost power converter.

As the load condition of the load 46 in FIG. 1 decreases, the feedback signal $V_{COM}$ is reduced in response to an increase of the output signal $V_{FB}$. Once the feedback signal $V_{COM}$ drops below the light-load threshold $V_{TH}$, which indicates a light-load condition, the power-saving signal $S_E$ is enabled after the delay period of the delay circuit 350. Once the switch 215 is turned on by the power-saving signal $S_E$ on the light-load condition, a programming current $I_Q$ of the current source 210 flows from the power source $V_{CC}$ toward the voltage divider 50 in FIG. 1, which increases the output signal $V_{FB}$ and therefore lowers the output voltage $V_O$.

The output voltage $V_O$ of the boost power converter regulated by the switching controller 100b can be expressed as, $$V_O = \frac{R_{51} + R_{52}}{R_{52}} \times V_R \qquad (1)$$

$$V_O = \left\{ \frac{R_{51} + R_{52}}{R_{52}} \times \left[ V_R - \left( I_Q \times \frac{R_{51} \times R_{52}}{R_{51} \times R_{51}} \right) \right] \right\} \qquad (2)$$

Where $R_{51}$ and $R_{52}$ are respectively resistance of resistors 51 and 52 which form the voltage divider 50; $V_R$ is the feedback threshold supplied to the error amplifier 200b.

Equation (1) shows the level of the output voltage $V_O$ when the power-saving signal $S_E$ is disabled. Equation (2) shows the level of the output voltage $V_O$ when the power-saving signal $S_E$ is enabled. The output voltage $V_O$ can be programmed by the ratio of the equivalent resistance of the voltage divider 50 and the programming current $I_O$.

According to equation (2), the output voltage $V_O$ can be programmed at a determined level on the light-load condition. Furthermore, the determined level of the output voltage $V_O$ on the light-load condition is externally adjustable, which greatly increases flexibility to meet practical power-saving requirements. Additionally, the present invention can also reduce conversion loss and improve the efficiency without adding circuitries and increasing costs on light-load conditions.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A switching controller for a power converter, comprising:
   a switching-control circuit, for generating a switching signal; and
   a programmable feedback circuit, coupled to an output of said power converter via a voltage divider, wherein said programmable feedback circuit provides a programming current to said voltage divider on a light-load condition, and said voltage divider is adjustable for programming an determined level of an output voltage at said output of said power converter in response to said programming current.

2. The switching controller as claimed in claim 1, said programmable feedback circuit comprising:
   an error amplifier, having a first terminal to receive an output signal from said voltage divider, said error amplifier further having a second terminal supplied with a feedback threshold, wherein said error amplifier generates a feedback signal in response to said output signal and said feedback threshold;
   a current source, generating said programming current;
   a switch, controlled by a power-saving signal, wherein said switch conducts said programming current supplied by said current source toward said voltage divider to modulate said output signal when said power-saving signal is generated on said light-load condition; and
   a power management circuit, coupled to said switching-control circuit and said error amplifier for generating said power-saving signal in response thereto.

3. The switching controller as claimed in claim 2, said power management circuit comprising:
   a comparison circuit, comparing said feedback signal and a light-load threshold, wherein said light-load condition is established when said feedback signal is lower than said light-load threshold.

4. The switching controller as claimed in claim 3, said power management circuit further comprising:
   a delay circuit, receiving a pulse signal from said switching-control circuit to provide a delay period, wherein when said light-load condition sustains for longer than said delay period, said delay circuit generates said power-saving signal.

5. The switching controller as claimed in claim 2, wherein said error amplifier is coupled to said switching-control circuit for modulating said switching signal.

6. The switching controller as claimed in claim 1, wherein said power converter is a boost power converter.

7. A switching controller for a power converter, comprising:
   a switching-control circuit, for generating a switching signal;
   an error amplifier, having a first terminal coupled to an output of said power converter via a voltage divider to receive an output signal, said error amplifier further having a second terminal supplied with a feedback threshold, wherein said error amplifier generates a feedback signal in response to said output signal and said feedback threshold;
   a current source, generating a programming current;
   a switch, controlled by a power-saving signal, wherein said switch conducts said programming current supplied by said current source toward said voltage divider to modulate said output signal on a light-load condition; and
   a power management circuit, coupled to said switching-control circuit and said error amplifier for generating said power-saving signal in response thereto.

8. The switching controller as claimed in claim 7, wherein said voltage divider is adjustable for programming a determined level of an output voltage at said output of said power converter in response to said programming current.

9. The switching controller as claimed in claim 7, wherein said light-load condition is established when said feedback signal is lower than a light-load threshold.

10. The switching controller as claimed in claim 9, said power management circuit comprising:
    a comparison circuit, comparing said feedback signal and said light-load threshold.

11. The switching controller as claimed in claim 10, said power management circuit further comprising:
    a delay circuit, receiving a pulse signal from said switching-control circuit to provide a delay period, wherein said delay period stabilizes a switching operation between different output voltage levels of said power converter in response to load conditions.

\* \* \* \* \*